United States Patent

Konczak

(10) Patent No.: US 9,353,887 B2
(45) Date of Patent: May 31, 2016

(54) MULTI-PURPOSE MICRO-TRENCH INSERT

(71) Applicant: Jeffrey J. Konczak, Alpena, MI (US)

(72) Inventor: Jeffrey J. Konczak, Alpena, MI (US)

(73) Assignee: SuperGrout, LLC, Saginaw, MI (US)

( * ) Notice: Subject to any disclaimer, the term of this patent is extended or adjusted under 35 U.S.C. 154(b) by 0 days.

(21) Appl. No.: 14/540,403

(22) Filed: Nov. 13, 2014

(65) Prior Publication Data

US 2015/0300527 A1  Oct. 22, 2015

Related U.S. Application Data

(60) Provisional application No. 61/981,326, filed on Apr. 18, 2014.

(51) Int. Cl.

| H02G 1/00 | (2006.01) |
|---|---|
| G02B 6/50 | (2006.01) |
| F16L 1/028 | (2006.01) |
| G02B 6/44 | (2006.01) |
| C04B 111/70 | (2006.01) |

(52) U.S. Cl.
CPC ............. *F16L 1/028* (2013.01); *G02B 6/504* (2013.01); *C04B 2111/70* (2013.01); *G02B 6/4459* (2013.01)

(58) Field of Classification Search
CPC ........ E02D 17/12; E02D 17/13; G02B 6/504; G02B 6/50; H02G 1/06
See application file for complete search history.

(56) References Cited

U.S. PATENT DOCUMENTS

| 1,588,897 | A | * | 6/1926 | Marston | 405/258.1 |
|---|---|---|---|---|---|
| 3,032,827 | A | * | 5/1962 | Schaffer | 264/35 |
| 4,063,429 | A | * | 12/1977 | Wilson | 405/157 |
| 4,464,082 | A | * | 8/1984 | Isaacs | 405/157 |
| 4,554,724 | A | * | 11/1985 | Bantz | 29/451 |
| 5,009,543 | A | * | 4/1991 | Ahmad et al. | 404/70 |
| 5,099,889 | A | * | 3/1992 | Ratzlaff | 138/110 |
| 5,879,109 | A | * | 3/1999 | Finzel et al. | 405/174 |
| 5,988,227 | A | * | 11/1999 | Magoffin | 138/110 |
| 6,315,493 | B2 | * | 11/2001 | Malone et al. | 405/45 |
| 6,335,087 | B1 | | 1/2002 | Hourahane | |
| 6,371,691 | B1 | * | 4/2002 | Finzel et al. | 405/157 |
| 6,702,518 | B2 | * | 3/2004 | Harris | 405/157 |
| 6,955,190 | B2 | * | 10/2005 | Koerner | 138/110 |
| 7,095,930 | B2 | * | 8/2006 | Storaasli et al. | 385/100 |
| 7,744,308 | B2 | * | 6/2010 | Bussey et al. | 405/45 |
| 2004/0165957 | A1 | * | 8/2004 | Serrano et al. | 405/157 |
| 2005/0191133 | A1 | * | 9/2005 | Purcell | 405/157 |
| 2006/0112653 | A1 | * | 6/2006 | Hogenson | 52/169.5 |
| 2007/0093602 | A1 | | 4/2007 | Thompson-Colon et al. | |
| 2012/0048148 | A1 | | 3/2012 | Konczak | |
| 2013/0011198 | A1 | * | 1/2013 | Pichler et al. | 405/157 |
| 2013/0216313 | A1 | * | 8/2013 | Gustaysson et al. | 405/157 |

FOREIGN PATENT DOCUMENTS

GB       2373530 A       9/2002

\* cited by examiner

*Primary Examiner* — Benjamin Fiorello
(74) *Attorney, Agent, or Firm* — Dickinson Wright PLLC

(57) ABSTRACT

A micro-trench filling system and method of filling a trench holding a conduit is provided. The micro-trench filling system includes a trench formed into a covering surface, a conduit disposed in the bottom of the trench, a structural filler disposed on the conduit in the bottom of the trench, the structural filler made of a mesh material and having a plurality of openings; and a flowable filler poured into the trench and over the structural filler and surrounding the conduit. The flowable filler flows through the plurality of openings of the structural filler creating a bond between the flowable filler and structural filler, the flowable filler cures after a predetermined amount of time, and the structural filler and the flowable filler hold the conduit in place.

16 Claims, 9 Drawing Sheets

MULTI-PURPOSE MICRO-TRENCH INSERT

RELATED APPLICATIONS

This application claims benefit to provisional application No. 61/981,326, filed on Apr. 18, 2014 entitled Multi-Purpose Micro-Trench Insert.

TECHNICAL FIELD

The present disclosure broadly relates to a system and method for filling a crack or void formed through a covering substrate. More particularly, the present disclosure relates to a system and method for filling a trench formed through a covering substrate, including a structural filler disposed in the trench.

BACKGROUND OF THE INVENTION

Fiber optic cables have been widely employed to allow for the transmission of digital information over long distances and the need for such cables continues to grow both in the U.S. and internationally. The configuration and structure of these fiber optic cables provides better quality signal transmission than conventional cables as fiber optic cables are less likely to suffer degradation or signal loss during transmission over the cable length. However, the exponential growth of fiber optic cables has created challenges as to how to manage and install this new technology so that its capabilities can be easily provided to all areas. These cables are generally installed below ground and one solution that has emerged for their effective installation is a process called "micro-trenching." Micro-trenching is a known process that allows fiber optic cables as well as other cables and pipes to be installed below ground at a significantly lower cost and with a relatively low-impact to the surrounding areas as compared to other installation processes.

In general, with micro-trenching, a small trench is cut in the ground, typically using a trenching machine that is capable of cutting through cement, asphalt, earth, etc. Once the micro-trench is created, a conduit such as a plastic sleeve can be inserted into the trench along its length. The conduit can be a continuous sleeve or can consist of multiple sections that are coupled together along the length of the trench. One or more fiber optic cables or pipes may then be housed in the conduit, which the conduit serves to provide protection therefore. Once the conduit and its contents are situated in the trench, a flowable composition or filler can be used to partially or completely fill the micro-trench and fix the conduit therein. Once the composition hardens and fills the trench, the conduit is securely fixed therein. Other micro-trenching processes involve laying the fiber optic cable in the trench without a conduit.

Micro-trenching may be formed in a subsurface or covering surface, such as a street, sidewalk or roadway, to form a trench. One or more conduits may then be disposed in the trench, which are configured to house items, such as fiber optic cables or the like which may be connected to different electronics in the area. Alternatively, pipes or other items can also or alternatively be placed in the trench. As mentioned above, the cables may be placed directly into the trench without any encapsulating conduit. The trench may then be filled with a flowable filler such as non-shrinking concrete, polymer resins or a grout. The flowable filler fills the trench and surrounds the conduit or cable. After the flowable filler has cured and hardened, a sealer can then be placed on top of the flowable filler to provide protection to the trench and also to minimize the visual impact of the micro-trenching process.

Current flowable fillers for micro-trenches generally consist of a cementitious grout material. An exemplary grout material known in the art is "Portland cement." While Portland cement materials are most common, other materials such as a relatively high-alumina cement material, granulated blast furnace slag cement and slag/Portland cement blends are also well known for this type of application.

As is well known, fillers that utilize a cementitious grout have disadvantages. One disadvantage of current grout materials is that they can suffer shrinkage as they harden or over time, which can lead to relatively significant surface defects as well as to a relatively high amount of consolidation both of which are too significant for success as a micro-trench grout application. This can also leave the conduit and the fiber optic cables housed therein unprotected and susceptible to damage. The same applies to fiber optic cables disposed directly into the trench.

Due to the issues associated with cementitious grout materials, other fillers for micro-trenching have been explored, but they also suffer from some limitations. For example, a recent proposal for a new micro-trenching method involves forming a trench in the pavement alone. In other words, the trench would be cut into the pavement and not the underlying substrate. The resulting trench would thus be very shallow, such as on the order of three (3) inches. After the trench is cut, one or more fiber optic cables would be laid into the trench. Thereafter, polyurea filler would be inserted into to the trench to fill it up to a level below the road surface. The filler would serve to hold the fiber optic cables in place and fill in the trench. An asphalt sealer could then be utilized to fill in the remainder of the trench and then match the trench surface with the surrounding roadway.

A couple of significant disadvantages have arisen with regard to this proposed technique. The resulting trench is unsuitable for the fiber optic cables because forming the trench and/or the polyurea filler can create issues with the foundation of the road. Specifically, the polyurea filler is substantially stronger than prior grout fillers and is actually stronger than the surrounding road which can affect the foundation of the surrounding road. Additionally, as many micro-trenching operations create part of the trench in the underlying substrate, this can create some problems as polyurea does not form a bond with the underlying substrate. Moreover, the cost of the polyurea material is very high. Further, polyurea material has a much shorter cure time than a cementitious grout material, which can be problematic in keeping the conduit for the fiber optic cables in place as it can expand due to heat before the polyurea filler has cured completely. For example, a polyurea can begin to harden within three minutes of placement and may be fully cure within 20 minutes. As is also known, conduits can expand up to 20-30% in length after curing which may cause the conduit to be pushed up to above the surface thereby exposing the fiber optic cables and conduit to damage. To overcome this issue, an additional clipping step must be performed to anchor the conduit within the trench. Moreover, as polyurea has a very low viscosity, using it to fill trenches formed in a non-planar surface, such as a hill or the like, can create filling issues. In other words, the polyurea filler may flow out of the trench. Lastly, existing sealers can be difficult to bond to a polyurea filler.

Thus, there is a need and desire for a filler system for use with micro-trench applications that overcomes the disadvantages with existing systems.

SUMMARY OF THE DISCLOSURE

It is therefore an aspect of the present disclosure to provide a filling system for use in micro-trenching applications that provides improved structural stability.

It is another aspect of the present disclosure to provide a filling system for use in micro-trenching applications that is less expensive.

It is a further aspect of the present disclosure to provide an insert for use in filling a micro-trench that can be utilized with a variety of different filling materials.

It is still another aspect of the present disclosure to provide a filling system for use in micro-trenching applications that allows for the creation of a strong bond with an asphalt sealer used overtop of the filled micro-trench.

In accordance with the above and the other aspects of the present disclosure, a filling system for use in micro-trenching applications, is provided as shown and described.

The aspects disclosed herein provide various advantages. For example, the structural filler is lightweight and easy to install prior to back filling the micro-trench with a polymeric material. The structural filler eliminates the need for unreliable, expensive, and labor consuming clips to prevent the conduit from floating within the polymeric material because of buoyancy or expansion due to heat generated by the curing process of polyurea backfill. The structural filler also reduces the required amount of back fill by up to 50% and adds strength and stability to the micro-trench. The structural filler additionally easily bonds with the sealer or elastomeric polyurea by allowing the seal/elastomeric polyurea to flow through the structural filler creating a strong mechanical bond. Furthermore, the structural filler reduces the tendency of back fill types to flow downhill when used on uneven roads and sidewalks. Specifically, the structural filler creates a natural baffle system within the micro-trench which slows the movement of the filler during the back filling process.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

Detailed examples of the present disclosure are disclosed herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure.

With the acceptance and explosion of micro-trenching as a process for installing fiber optics cables, efforts at developing improved micro-trenching techniques are underway. According to an aspect, the present disclosure relates to an improved system and method for micro-trenching that overcomes the problems with existing micro-trenching techniques. The aspects disclosed herein provide a micro-trench filling system and a method of filling a micro-trench.

As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations.

Figure 1A:
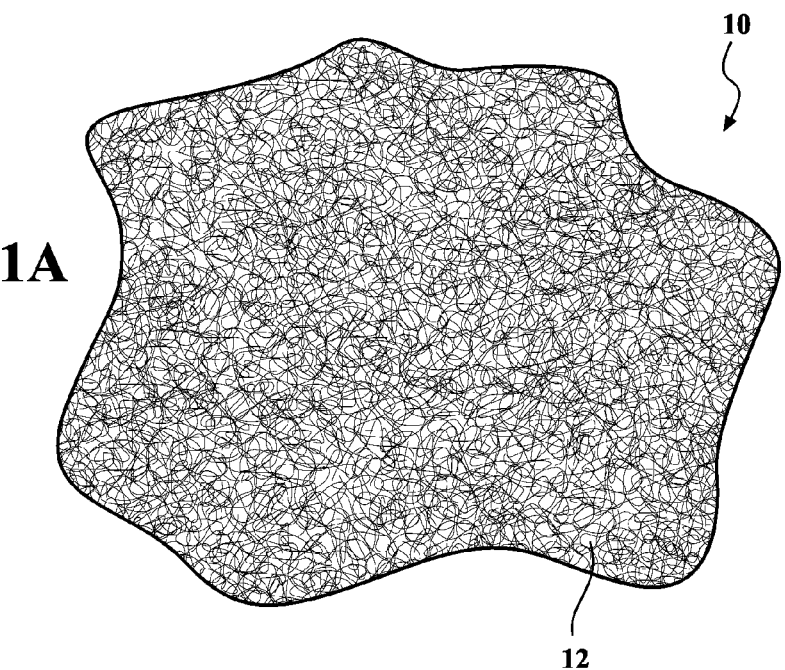
FIG. 1A-C are various views of a structural filler of the micro-trench filling system in accordance with the present disclosure.
Figure 1B:
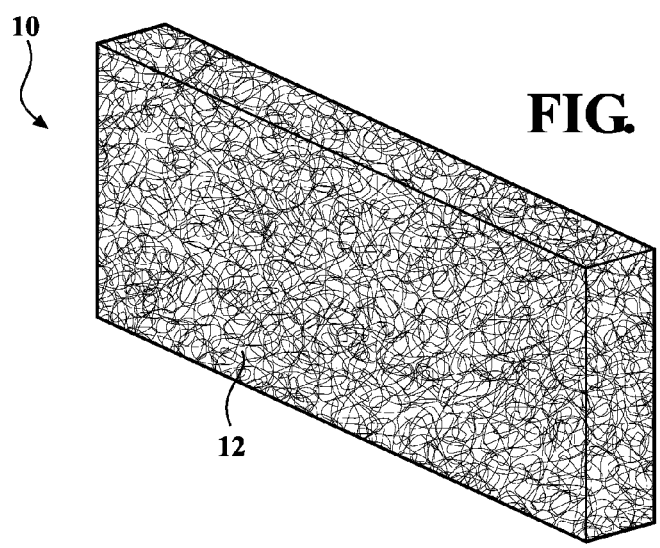
Figure 1C:
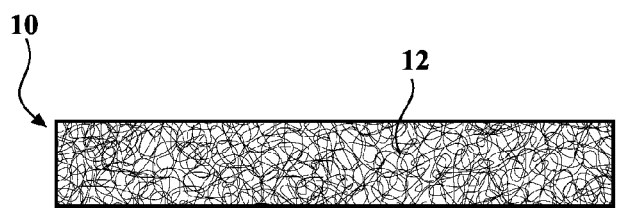

FIGS. 1A-C show various views of a structural filler 10 of a micro-trench filling system in accordance with the present disclosure. In particular, FIG. 1A shows a front view of the structural filler 10 of the micro-trench filling system. The structural filler 10 may be made of a mesh material. The structural filler 10 may be rigid. The structural filler 10 may have a weight or thickness between 100-1000 denier. Additionally, the structural filler 10 may be easily compressed based its weight or thickness. The structural filler 10 may also have a plurality of openings 12. The plurality of openings 12 may be designed to allow a flowable material to flow through the structural filler. The plurality of openings 12 may be different in size based on the weight or thickness of the structural filler 10. According to another aspect, the structural filler 10 may have a relatively porous material such that a flowable material may flow through the structural filler 10 creating a strong bond between the structural filler 10 and the flowable material. The structural material 10 may be lightweight and flexible for easy installation and use. The structural filler 10 may be formed as a single unit. Additionally, the structural filler 10 may be stored in a rolled form and unwound as needed to be placed into a trench. It will be appreciated that the structural filler 10 can be formed of a variety of different materials. The structural filler 10 can also be formed in a variety of different shapes and size and may also be formed in multiple units instead of a single unit. Additionally, the mesh material may be a metallic material or a synthetic fiber.

Similarly, FIGS. 1B-C show a perspective view and a top view of the structural filler 10 in accordance with the present disclosure. One skilled in the art appreciates that the structural filler 10 may come in different sizes depending on the length and width of the trench receiving the structural filler 10.

Figure 2:
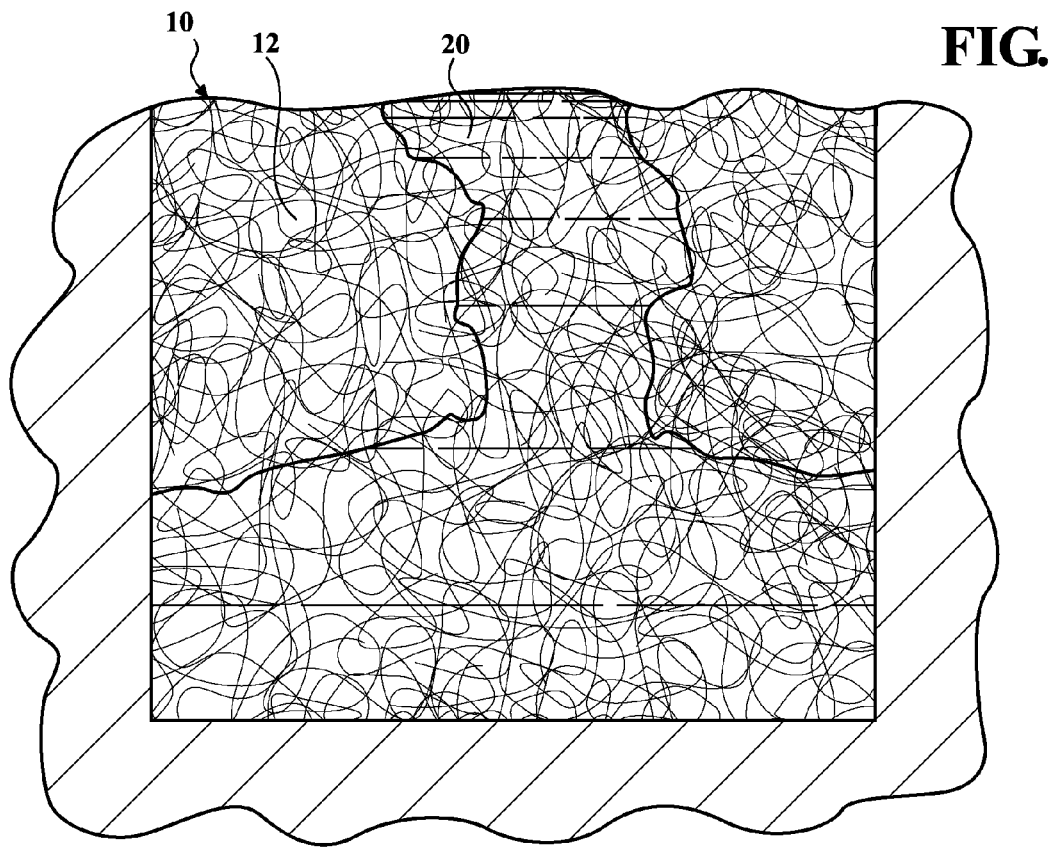
FIG. 2 is an illustration of a structural filler and a flowable filler of the micro-trench filling system in accordance with the present disclosure.

FIG. 2 shows an illustration of a structural filler 10 and a flowable filler 20 of the micro-trench filling system in accordance with the present disclosure. In particular, FIG. 2 shows the structural filler 10 being made of a mesh material as described above with a plurality of openings 12 designed to allow a flowable filler 20 to flow throughout the structural filler 10 creating a strong bond with the structural filler 10. The flowable filler 20 could be made of a variety of suitable materials. For example, the flowable fill 20 could be a cementitious grout. The flowable filler 20 could also be a polymeric resin such as polyurea or another suitable substance capable of forming a strong bond with the structural filler 10. Additionally, the flowable filler 20 could be any of the materials known in the prior art or by one skilled in the art. In FIG. 2, the flowable filler 20 may be poured over and flow throughout the structural filler 10 to create a strong bond between the flowable filler 20 and the structural filler 10. The flowable filler 20 can cure and harden within the structural filler 10 after a predetermined amount of time.

Figure 3:
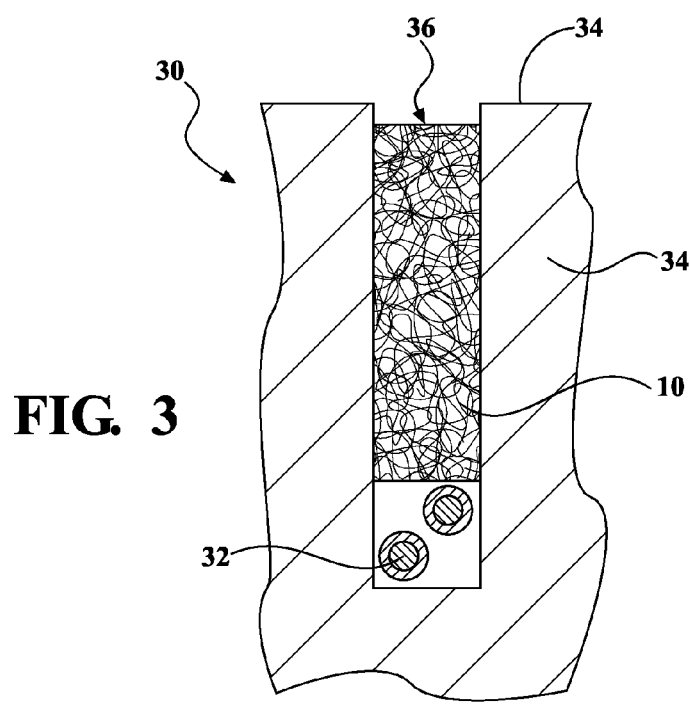
FIG. 3 is a cross-sectional view of a micro-trench filling system in accordance with the present disclosure.

In regards to FIG. 3, a cross-sectional view of a trench 30 in accordance with the present disclosure is provided. According to an aspect, the trench 30 is constructed to receive a conduit 32 or a plurality of conduits forming an underground cable line. The conduit 32 may be a fiber optic cable or other types of cables. The conduit 32 may also be a protective sleeve for receiving fiber optic cables or other types of cables. The trench 30 may be formed in a covering surface 34 which is normally preexisting. Such existing covering surface 34 could be, but is not limited to, pavement, paving, concrete, asphalt, blacktop, cobblestone, brick, other road base, grade or surface, or the like, or any combination of the foregoing (e.g. combination of asphalt laid over concrete).

A void or channel 36 may be formed in the upper portion of the covering surface 34, such as concrete, as well as in the underlying substrate. The void or channel 36 may be formed in the covering surface 34 by cutting the ground to a predetermined depth. The trench 30 can be formed of varying depths. The void or channel 36 can then be cleaned or evacuated to remove dirt, debris, or other materials to create the trench 30. Additionally, the void or channel 36 may be formed by a machine designed to cut through concrete surfaces or the like. Such machine for forming such a cut can include a cutter with a narrow rotating blade that cuts through the existing covering surface 34 leaving the void or channel 36 behind. The machine may be a portable machine having wheels or may be any other kind of a suitable machine for creating the cut. The machine may also be used for cleaning or evacuating the void by blowing, vacuuming, and/or sweeping the void. The machine may have a conventional vacuum system that removes dirt from the trench as the void is cut. An example of a machine which is acceptable for use in carrying out the steps of cutting and evacuating is commercially available from DITCHWITCH of Perry, Okla. Alternatively, another machine separate from the cutting machine may be employed to clean the void.

After the trench 30 has been cut and cleaned, the conduit 32 (cable, duct, and/or conduits) may be laid or placed into the void or channel 36 of the trench 30. This may be performed by hand or machine. Alternatively, one or more cables may be placed into the conduit 32 as discussed above. It will be appreciated that multiple conduits may be disposed within the void or channel 36 of the trench 30. Additionally, a plurality of cables running to individual residents may be placed in the conduit 32 or trench together with a main cable. Alternatively, a fiber optic cable or a plurality of fiber optic cables may be disposed directly into the trench without the use of a protective conduit. According to an aspect of the present disclosure, the structural filler 10 described above may be disposed on the conduit 32 to hold the conduit 32 in place within the trench 30. According to another aspect, the structural filler 10 and the flowable filler 20, shown in FIG. 2, may be disposed on the conduit 32 to hold the conduit 32 in place within the trench 30 and will be described in further detail below.

Figure 4A:
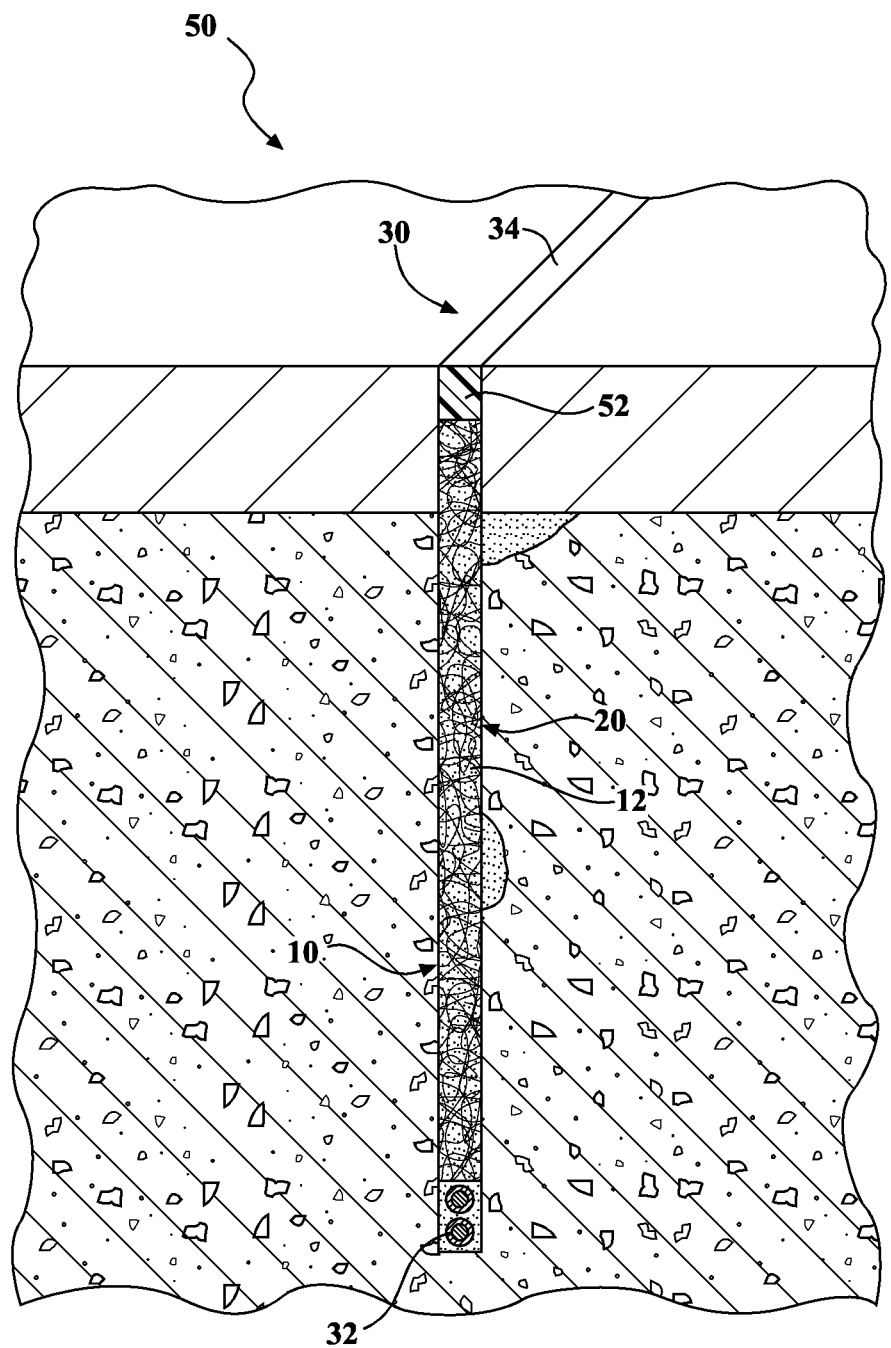
FIGS. 4A-4F are illustrations of a micro-trench filling system in accordance with the present disclosure.

FIGS. 4A-4F are illustrations of a micro-trench filling system 50 in accordance with aspects of the present disclosure. More specifically, FIG. 4A shows an aspect of the micro-trenching filling system 50 having a trench 30 of a predetermined depth. The micro-trench filling system 50 includes a trench 30 cut into a covering surface 34 forming a channel 36. The covering surface 34 may be a road or a sidewalk. As discussed above, the trench 30 may have a variety of depths. For example, as shown in FIG. 4A, the trench 30 can have a depth of twelve inches. The channel 36 may be designed to receive a plurality of conduits. The conduit 32 or plurality of conduits may be disposed within the bottom of the trench 30. As discussed above, the conduit 32 may be a protective sleeve housing fiber optic cables or the conduit 32 may be a fiber optic cable.

Once the conduit 32 may be placed into the trench 30, the structural filler 10 may be inserted into the trench 30 and may be disposed on the conduit 32 to firmly hold the conduit 32 in place. After the structural filler 10 may be inserted into the trench 30 securing the conduit 32 in place, the flowable filler 20 may be poured into the trench 30 over the structural filler 10. The flowable filler 20 can flow through the plurality of openings of the structural filler 10 to create a strong bond between the structural filler 10 and the flowable filler 20. The flowable filler 20 may also surround the conduit 32. The flowable filler 20 may be filled to around the top of the structural filler 10 to fill the remaining portions of the trench 30. The flowable filler 20 can then harden and cure after a predetermined amount of time. Additionally, the flowable filler 20 may fill unintentional voids 54 in the covering surface 32 caused during the micro-trenching process to fully encapsulate the conduit 32 and structural filler 60.

A sealing material or a second flowable filler 52 may then be used to fill the remaining area of the trench 30 to the top of the covering surface 34 as well as to match the ground surface. Such sealing material or second flowable filler 52 may include, but is not limited to, an asphaltic sealer or other elastomeric sealer. The sealing material 52 can then be poured over the top of the structural filler 10 and over the flowable filler 20 to fill and seal the remaining trench 30. This not only causes the system to adhere to the sidewall of the trench 30, but also mechanically locks the system into place which greatly reduces the risk of being pulled from the microtrench.

Figure 4B:
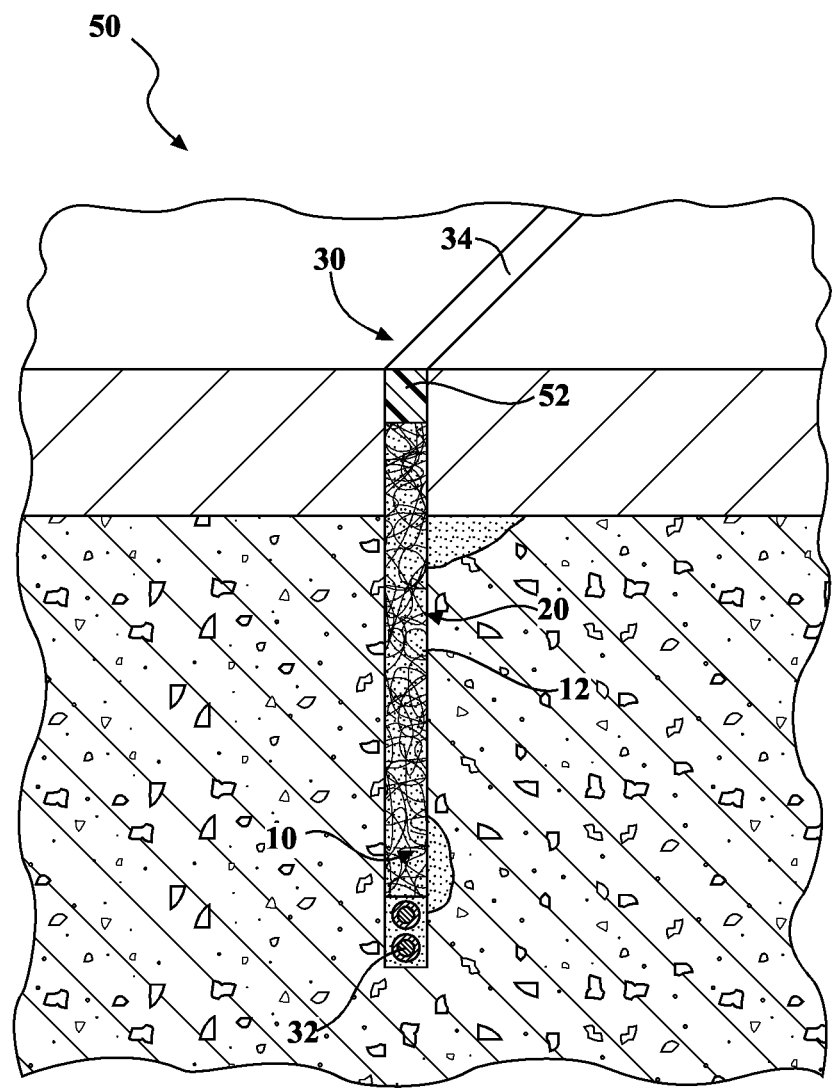
Figure 4C:
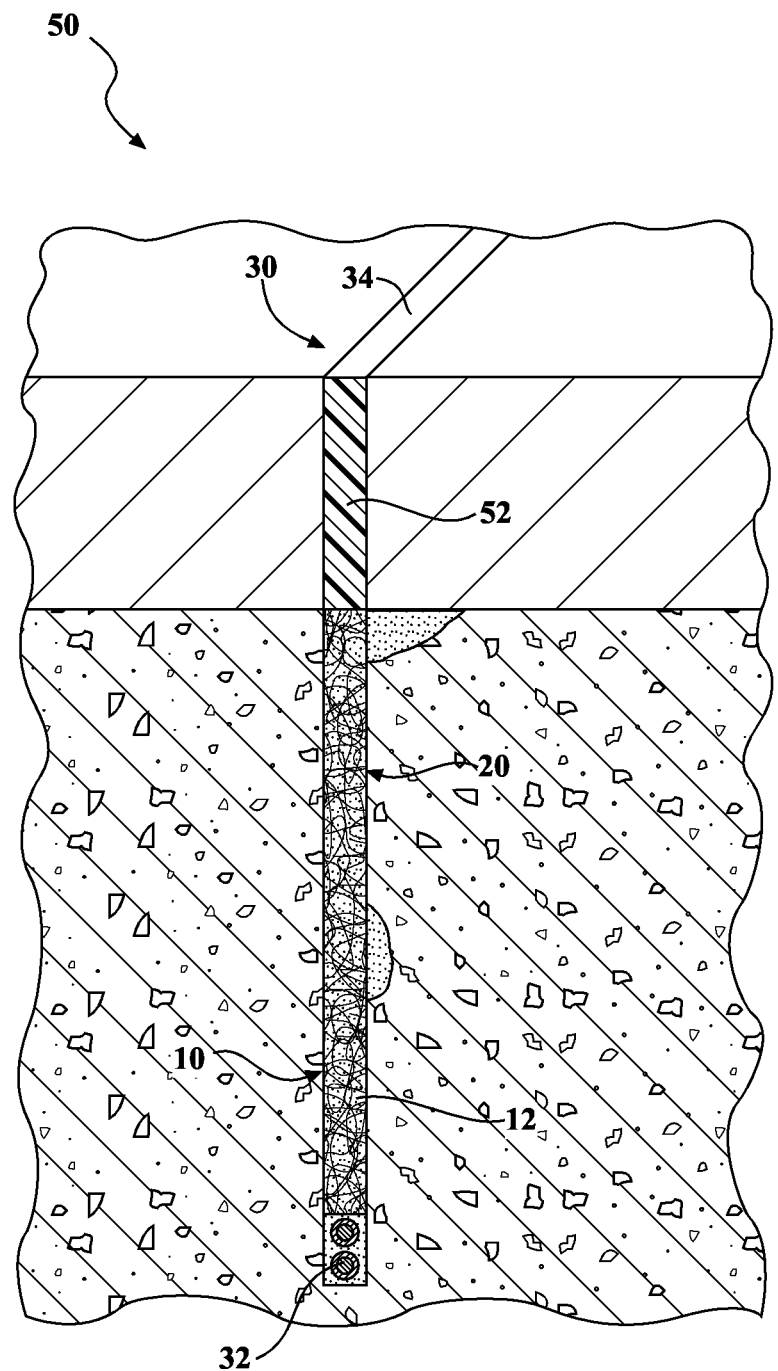
Figure 4D:
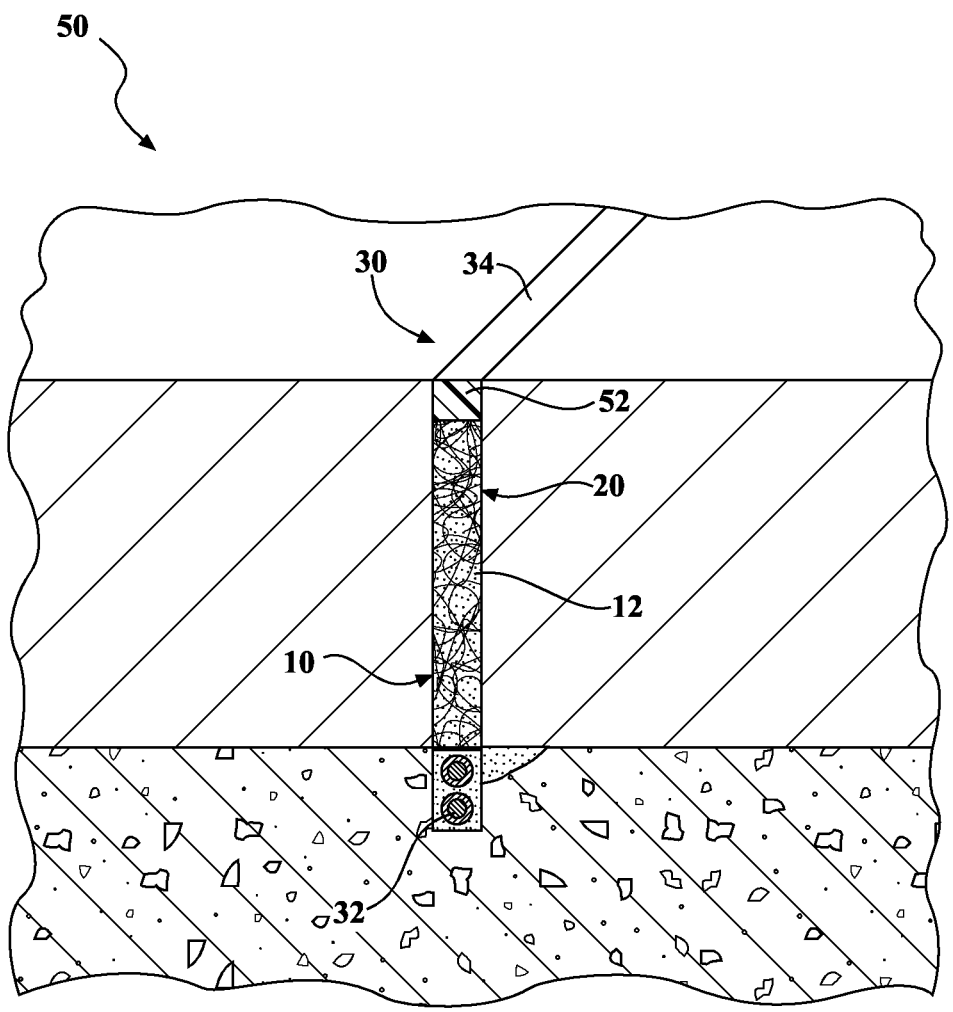
Figure 4E:
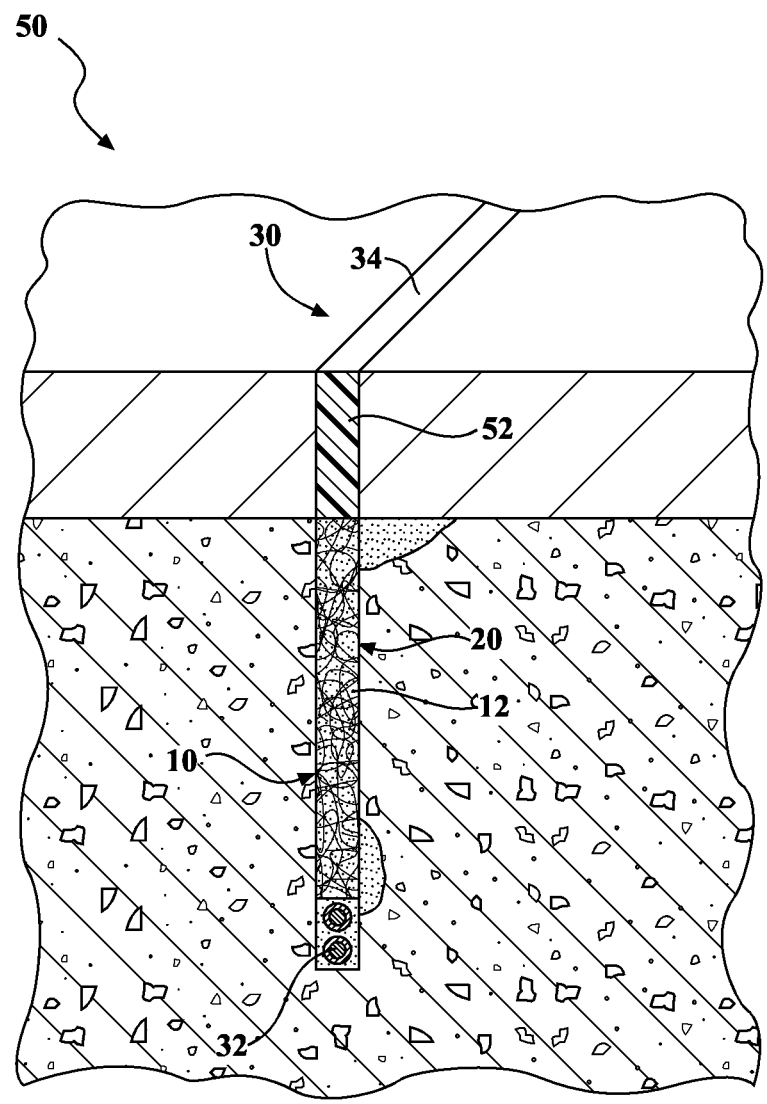
Figure 4F:
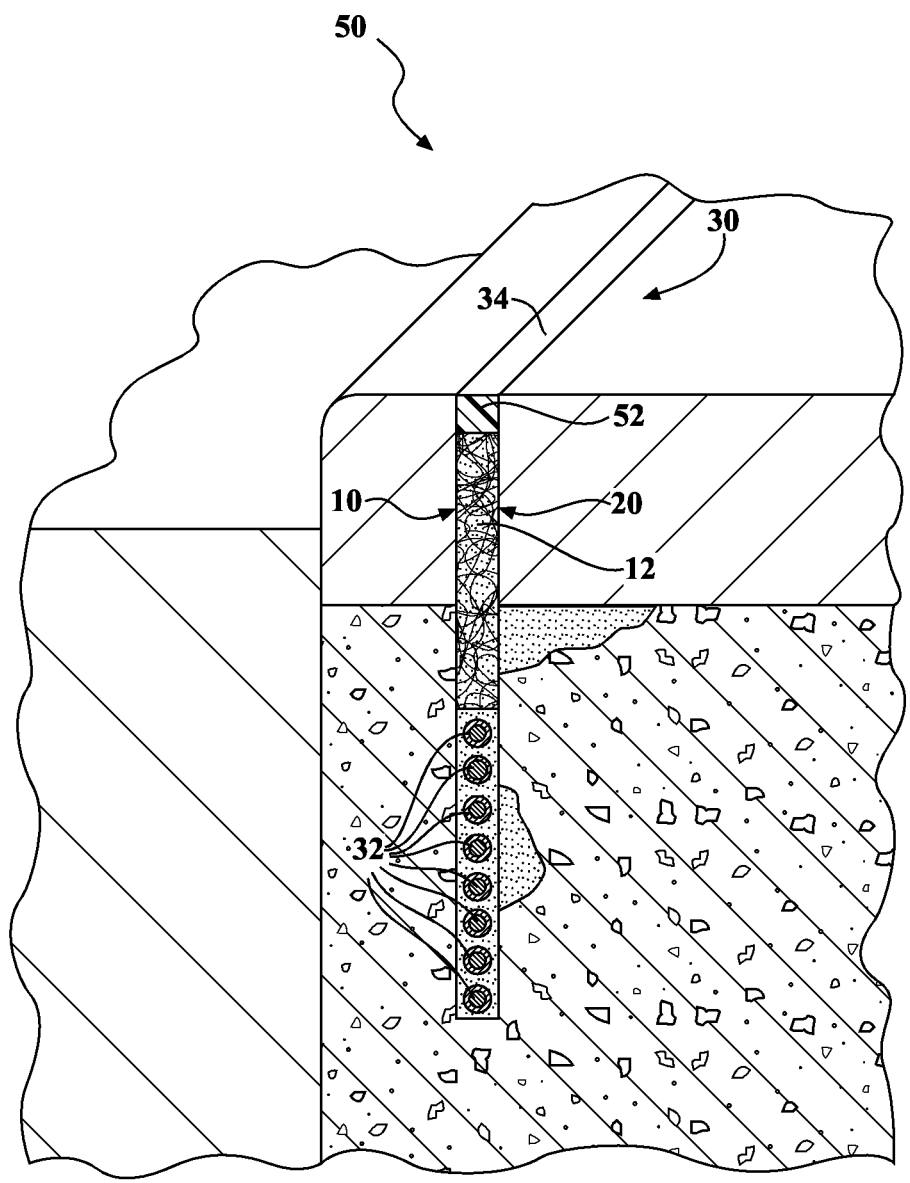

FIG. 4B shows a second aspect of the micro-trenching filling system 50 having a trench 30 of a predetermined depth. FIG. 4B utilizes the same components as discussed above with FIG. 4A except that the trench 30 may have a predetermined depth of eight inches. FIG. 4C shows a third aspect of the micro-trenching filling system 50 having a trench 30 of a predetermined depth of 12 inches and utilizes a plurality of flowable fillers 20. For example, a cementitious grout and a polyurea filler. FIG. 4D shows a fourth aspect of the micro-trenching filling system 50 having a trench 30 of a predetermined depth. In particular, the trench 30 is four inches in depth. FIG. 4E shows a fifth embodiment of the micro-trenching filling system 50 having a trench 30 of a predetermined depth. In the fifth aspect, a plurality of flowable fillers 20 is used to fill and seal the eight inch trench 30. Such flowable fillers 20 may include a cementitious grout and in a polyurea filler. FIG. 4F shows a sixth aspect of the micro-trenching filling system 50 having a trench 30 of a predetermined depth. In particular, FIG. 4F shows the micro-trenching filling system 50 utilized in a sidewalk as the covering surface 34 instead of the road.

Figure 5:
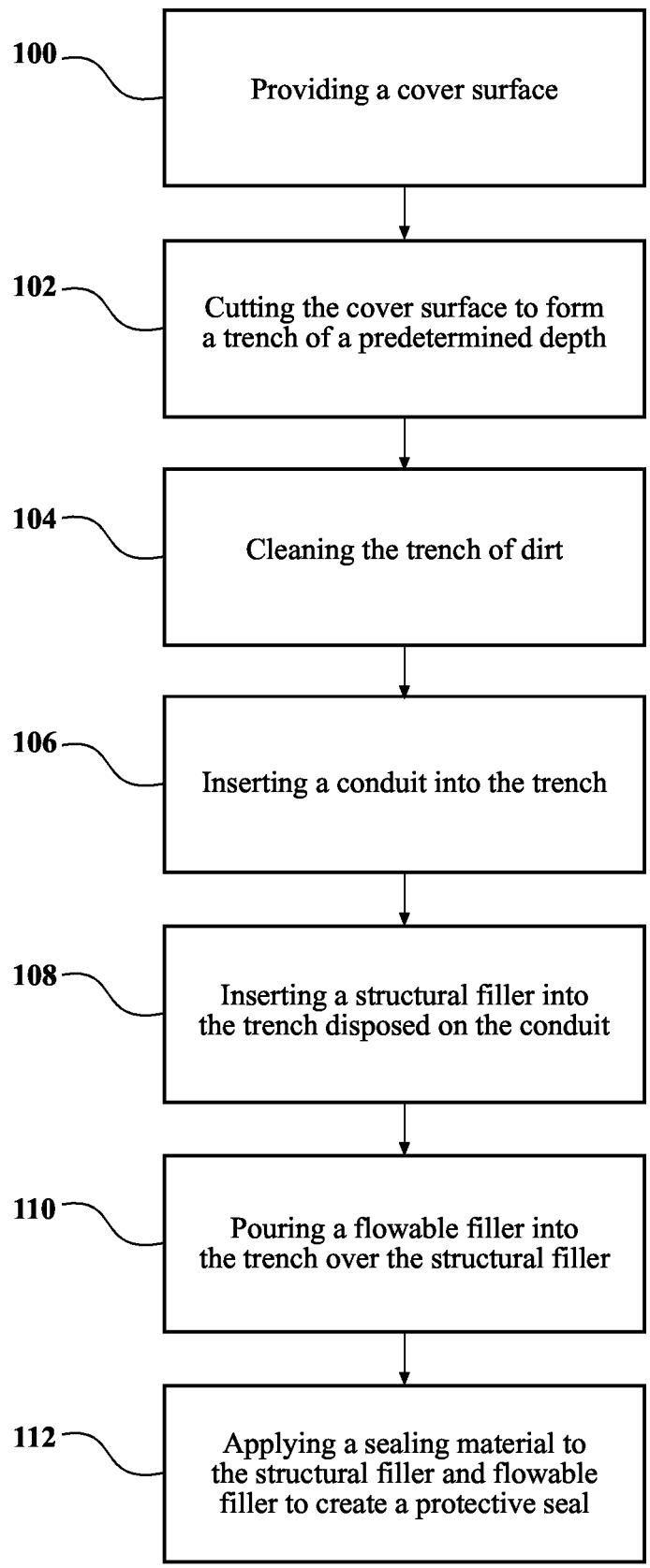
FIG. 5 is a flowchart of a method for filling a trench in accordance with the present disclosure.

With respect to FIG. 5, a flowchart of a method for filling a trench in accordance with the present disclosure is provided. The method includes providing a covering surface for the trench to be cut 100. This covering surface may be a road or a sidewalk. After the covering surface is determined 100, a trench may be cut into the covering surface to a predetermined depth 102. Cutting the trench could employ the machine(s) discussed above. The trench may then be cleaned to clear dirt, debris, or other materials 104. This may be done by hand or through a machine having a vacuuming system.

After the trench is cleaned 104, a conduit may be placed within the bottom of the trench 106. The conduit may be a protective sleeve designed to receive a cable or a plurality of cables such as fiber optic cables or the conduit may be the cable itself. Once the conduit is inserted within the trench 106, the structural filler may be inserted within the trench and may be disposed on the conduit 108. The structural filler may have the characteristics discussed above. Additionally, the structural filler may be disposed in the trench such that an upper edge may be exposed to allow the sealing material such as an asphalt sealer to connect thereto. The structural filler may be configured such that its side surfaces are aggressive enough to contact the sides of the trench and to provide some friction. Moreover, the structural filler may be designed to hold the conduit in place and prevents the conduit from rising or floating to the top of the trench after a flowable filler can be poured over the structural filler. A flowable filler or a plurality of flowable fillers may then be poured over and around the structural filler 110. The flowable filler having the ability to flow easily through the structural filler and filling any voids in the surrounding side surfaces of the trench. A sealing material or polymeric elastomer is applied to or poured over the structural filler and flowable filler to the final half inch or inch of the trench 112. This creates a watertight seal that protects the micro-trench, road or sidewalk, as well as the conduit.

In operation, placing the structural filler in the trench can serve to displace the need for a considerable portion of the flowable filler. This can represent a significant cost savings when the flowable filler is a polyurea or similar material that is expensive. The utilization of an inexpensive structural filler in place of some of the flowable filler is highly advantageous. Also, the structural filler of the present disclosure can provide benefits in terms of gripping due to its aggressive configuration being capable of creating friction with the side of trench to keep it in place as well as the conduit on which it can rest. Additionally, by providing a structural filler with openings, the flowable filler can flow there through to fully fill the trench and secure the structural filler in place. The structural filler can thus serve as a backbone to the flowable filler and the system, which allows the micro-trench system to withstand high temperatures, system movement due to freeze/thaw cycles as well as increase its resistance due to frost heave. By sizing and configuring the structural filler in the trench such that its upper end is adjacent the upper surface, the asphalt sealer can contact the structural filler and bond thereto.

By inserting the structural filler into the trench, another advantage relates to the street or sidewalk topography as flowable fillers such as cementitious grouts or polymer resins have low viscosity ratings and will tend to flow downhill due to gravity, which can cause uneven micro-trench filling. By having the structural filler present as a backbone, the gravity flow can be disrupted and the material held in place, thus allowing for a single fill pass rather than multiple fill steps.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed:

1. A micro-trench filling system, comprising;
   a trench formed into a covering surface;
   an air-tight conduit disposed in the bottom of the trench;
   a structural filler disposed on the conduit in the bottom of the trench, and
   a flowable filler disposed in the trench and over the structural filler and surrounding the conduit,
   wherein the structural filler is made of a mesh material and has a plurality of openings, wherein the structural filler and the flowable filler completely covers and holds the conduit in place within the trench.

2. The micro-trench filling system of claim 1, wherein the flowable filler flows through the plurality of openings of the structural filler creating a bond between the flowable filler and structural filler, wherein the flowable filler cures after a predetermined amount of time, and wherein the structural filler and the flowable filler hold the conduit in place.

3. The micro-trench filling system of claim 1, further comprising:
a sealing material applied over the flowable filler and structural filler for creating a protective seal across the trench.

4. The micro-trench filling system of claim 3, wherein the sealing material is an asphalt sealer.

5. The micro-trench filling system of claim 1, wherein the conduit is a protective sleeve for receiving a cable.

6. The micro-trench filling system of claim 1, wherein the conduit is a fiber optic cable.

7. The micro-trench filling system of claim 1, wherein the trench has a predetermined depth of less than 13 inches.

8. The micro-trench filling system of claim 1, wherein structural filler is a single unit.

9. The micro-trench filling system of claim 1, wherein the structural filler is made of a metallic material.

10. The micro-trench filling system of claim 1, wherein the structural filler is made of synthetic fiber.

11. The micro-trench filling system of claim 1, wherein the flowable filler is a cementitious grout.

12. The micro-trench filling system of claim 1, wherein the flowable filler is a polymeric elastomer.

13. A method for filling a micro-trench for holding an air-tight conduit, comprising:

cutting a trench from a covering surface forming a channel within the covering surface;

inserting the air-tight conduit into the bottom of the channel of the trench;

inserting a structural filler into the channel of the trench, the structural filler being disposed on the conduit and the structural filler being made of a mesh material and having a plurality of openings;

pouring a flowable filler into the channel of the trench, wherein the flowable filler flows through the plurality of openings of the structural filler to create a bond between the flowable filler and the structural filler and surrounds the conduit, wherein the air-tight conduit is completely covered by the structural filler and the flowable filler such that the air-tight conduit is held in place within the bottom of the trench.

14. The method of claim 13, further including:
applying a sealing material to the trench over the structural filler and flowable filler to create a protective seal across the trench.

15. The method of claim 13, further including:
clearing debris from the trench after the trench is cut.

16. The method of claim 13, further including:
providing a location for the trench to be cut.

* * * * *